United States Patent
Sforzin et al.

(10) Patent No.: US 11,775,382 B2
(45) Date of Patent: Oct. 3, 2023

(54) MODIFIED PARITY DATA USING A POISON DATA UNIT

(71) Applicant: Micron Technology, Inc., Boise, ID (US)

(72) Inventors: Marco Sforzin, Cernusco Sul Naviglio (IT); Paolo Amato, Treviglio (IT); Daniele Balluchi, Cernusco Sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/541,956

(22) Filed: Dec. 3, 2021

(65) Prior Publication Data

US 2022/0179736 A1    Jun. 9, 2022

Related U.S. Application Data (60) Provisional application No. 63/123,130, filed on Dec. 9, 2020.

(51) Int. Cl.
*G06F 11/10* (2006.01)
*G06F 11/22* (2006.01)

(52) U.S. Cl.
CPC ...... *G06F 11/1004* (2013.01); *G06F 11/1016* (2013.01); *G06F 11/1044* (2013.01)

(58) Field of Classification Search
None
See application file for complete search history.

(56) References Cited

U.S. PATENT DOCUMENTS

| | | | |
|---|---|---|---|
| 4,388,684 A * | 6/1983 | Nibby, Jr. | G06F 11/1044 714/763 |
| 8,438,452 B2 | 5/2013 | Agarwal et al. | |
| 8,910,280 B2 | 12/2014 | Karasaridis | |
| 9,213,609 B2 | 12/2015 | Hansen et al. | |
| 9,391,638 B1 * | 7/2016 | Metuki | H03M 13/3723 |
| 10,445,236 B2 | 10/2019 | Boyle | |
| 11,388,268 B1 * | 7/2022 | Siva | H04L 69/10 |
| 2003/0126409 A1 | 7/2003 | Juan et al. | |

(Continued)

OTHER PUBLICATIONS

International Search Report and Written Opinion from related International Patent Application No. PCT/US2021/062164, dated Apr. 12, 2022, 12 pages.

*Primary Examiner* — April Y Blair
*Assistant Examiner* — Dipakkumar B Gandhi
(74) *Attorney, Agent, or Firm* — Brooks, Cameron & Huebsch, PLLC

(57) ABSTRACT

Systems, apparatuses, and methods related to modified parity data using a poison data unit. An example method can include receiving, from a controller of a memory device, a first set of bits including data and a second set of at least one bit indicating whether the first set of bits comprises one or more erroneous or corrupted bits. The method can further include generating, at an encoder of the memory device, parity data associated with the first set of bits. The method can further include generating, at logic of the memory device, modified parity data with the parity data component and the second set of at least one bit. The method can further include writing the first set of bits and the modified parity data in an array of the memory device.

23 Claims, 7 Drawing Sheets

(56) References Cited

U.S. PATENT DOCUMENTS

| | | | |
|---|---|---|---|
| 2007/0011598 A1* | 1/2007 | Hassner | H03M 13/19 |
| | | | 714/801 |
| 2007/0044007 A1* | 2/2007 | Cideciyan | G11B 20/1201 |
| 2010/0169551 A1* | 7/2010 | Yano | G06F 12/0246 |
| | | | 711/170 |
| 2011/0055659 A1* | 3/2011 | Tu | G06F 11/1068 |
| | | | 714/763 |
| 2013/0336430 A1* | 12/2013 | Au Yeung | H03M 13/3746 |
| | | | 375/340 |
| 2014/0006879 A1 | 1/2014 | Rangarajan | |
| 2015/0254136 A1* | 9/2015 | Hoya | G06F 11/1012 |
| | | | 714/764 |
| 2017/0068537 A1 | 3/2017 | Ramanujan | |
| 2017/0109232 A1 | 4/2017 | Cha et al. | |
| 2017/0111061 A1* | 4/2017 | Ish-Shalom | H03M 13/617 |
| 2019/0065314 A1 | 2/2019 | Sherlock et al. | |
| 2019/0155685 A1 | 5/2019 | Kim | |
| 2020/0125503 A1 | 4/2020 | Graniello et al. | |
| 2020/0241958 A1 | 7/2020 | Shin | |

\* cited by examiner

MODIFIED PARITY DATA USING A POISON DATA UNIT

PRIORITY INFORMATION

This application claims the benefit of U.S. Provisional Application No. 63/123,130, filed Dec. 9, 2020, the contents of which are incorporated by reference.

TECHNICAL FIELD

The present disclosure relates generally to semiconductor memory and methods, and more particularly, to apparatuses, systems, and methods for modified parity data using a poison data unit.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Systems, apparatuses, and methods related to modified parity data using a poison data unit are described. In some embodiments, a controller can receive data and a poison data unit associated with the data. An encoder component can generate parity data associated with the data. The controller can combine the parity data and the poison data unit, resulting in modified parity data associated with the data. The modified parity data can be stored in an array of memory cells.

Data received (e.g., to a memory system) from a host can be incorrect or corrupted. Such incorrect or corrupted data may be referred to as "poison data." A poison data unit (e.g., bit) can be used to indicate whether the received data is poison data. The poison data unit can be received, for example, as part of a write command. As an example, a poison bit value of "1" may indicate the received data corresponding to the write command is poison data, and a poison bit value of "0" may indicate that the received data corresponding to the write command is not poison data. Embodiments are not so limited. For instance, a poison bit value of "0" could be used to indicate poison data and a bit value of "1" could be used to indicate the data is not poison data.

In some prior approaches, an array of memory cells may store poison data units associated with the different portions of data that may or may not be poison data (depending the value of the poison data unit). For example, in these prior approaches, X data bits may be received and Z error correction code (ECC) bits are generated from the X data bits. In the scenario where ECC protected data is stored without a determination of whether the data is poison, X+Z=Y bits may be stored. In the scenario where poison data is monitored, Y+1 bits can be stored where the "+1" bit is a poison bit that indicates whether the data is poison data (e.g., a "1" indicates the data is poison, a "0" indicates the data is not poison).

However, as will be described further below, the poison data units may not be stored directly into the memory array or memory devices. For example, the poison data units may be combined or incorporated into parity data associated with the transferred data and thereby save memory space that would have otherwise stored the individual poison data units. This would include storing Y bits (X data bits+Z ECC bits) while still both ECC protecting the data and also indicating whether the data is poison data. The poison data can be determined by reading these Y bits. In this way, an amount of space for storing a particular portion of data in a memory array may be minimized. Put another way, the data and its associated parity data can be stored in a particular amount of memory space. The particular amount of memory space can also store the poison data units by combining or incorporating the poison data units into the parity data and storing the parity data in a same amount of memory space as when the parity data does not combine or incorporate the poison data units.

As described in more detail herein, a controller coupled to a memory device can receive a portion of data along with an associated poison data unit from an external device (e.g., a host or some other external memory device). The data can be encoded and parity data can be generated for protection of the data. The received poison data unit can be incorporated into the parity data in order to maintain whether the data is poison or not without storing the individual poison data unit itself. The data and the modified parity data can be stored in a memory device. In response to the external device requesting the data to be returned to the external device, the modified parity data can be decoded, as will be described below, and the data and the poison data unit can be returned to the external device. In this way, the data and its associated poison data unit can be maintained without storing the individual poison data unit in the memory device, thereby preserving more memory space.

In some embodiments, a memory system including the memory device can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (e.g., having the potential to, being able to), not in a mandatory sense (e.g., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 111 may reference element "11" in FIG. 1, and a similar element may be referenced as 211 in FIG. 2. A group or plurality of similar elements or components may generally be referred to herein with a single element number. For example, a plurality of reference elements 130-1 to 130-N may be referred to generally as 130. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
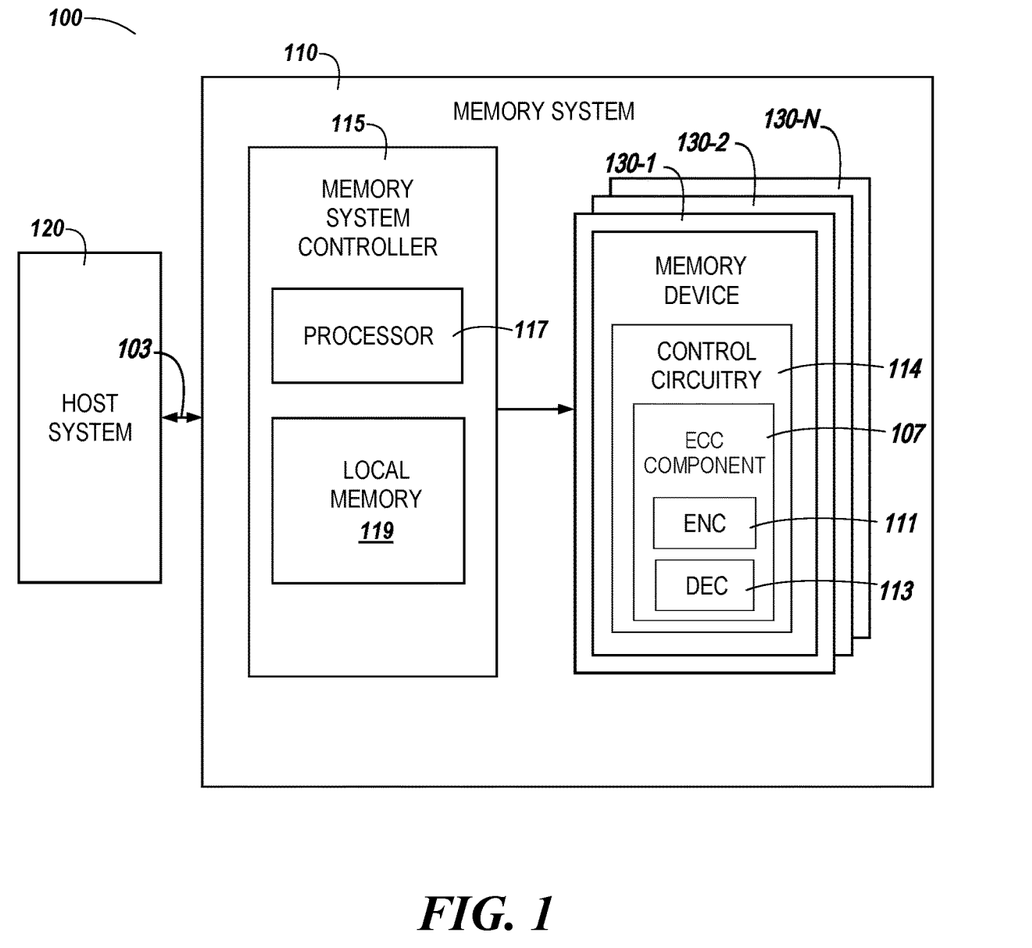
FIG. 1 is a functional block diagram in the form of a computing system including a memory system, which includes a controller and memory devices in accordance with a number of embodiments of the present disclosure.

FIG. 1 is a functional block diagram in the form of a computing system 100 including an apparatus including a memory system 110, which includes a controller 115, and memory devices 130-1 to 130-N in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In the embodiment illustrated in FIG. 1, the memory devices 130 can include one or more memory modules (e.g., single in-line memory modules, dual in-line memory modules, etc.). The memory devices 130 can include volatile memory and/or non-volatile memory. In a number of embodiments, the memory devices 130 can each include a multi-chip device. A multi-chip device can include a number of different memory types and/or memory modules. For example, a memory system can include non-volatile or volatile memory on any type of a module.

The memory device(s) 130 can provide main memory for the computing system 100 or could be used as additional memory or storage throughout the computing system 100. The memory device 130 can include one or more arrays of memory cells, (e.g., volatile and/or non-volatile memory cells). The arrays can be flash arrays with a NAND architecture, for example. Embodiments are not limited to a particular type of memory device. For instance, the memory device can include RAM, ROM, DRAM, SDRAM, PCRAM, RRAM, and flash memory, among others. Although shown as a single memory device 130, it will be appreciated that multiple memory devices are contemplated within the scope of the disclosure.

In embodiments in which the memory device 130 includes persistent or non-volatile memory, the memory device 130 can be flash memory devices such as NAND or NOR flash memory devices. Embodiments are not so limited, however, and the memory device 130 can include other non-volatile memory devices such as non-volatile random-access memory devices (e.g., NVRAM, ReRAM, FeRAM, MRAM, PCM), "emerging" memory devices such as a ferroelectric RAM device that includes ferroelectric capacitors that can exhibit hysteresis characteristics, a 3-D Crosspoint (3D XP) memory device, etc., or combinations thereof.

As an example, a ferroelectric RAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, a 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation in which a non-volatile memory cell can be programmed without the non-volatile memory cell being previously erased.

In some embodiments, the controller 115 can be a media controller such as a non-volatile memory express (NVMe) controller. For example, the controller 115 can be configured to perform operations such as copy, write, read, error correct, etc. for the memory device 130. In addition, the controller 115 can include special purpose circuitry and/or instructions to perform various operations described herein. That is, in some embodiments, the controller 115 can include circuitry and/or instructions that can be executed to modify parity data using a poison data unit (also referred to herein as a second set of at least one bit, where the second set of at least one bit indicates whether a first set of bits comprises one or more erroneous or corrupted bits). In some embodiments, circuitry and/or instructions provided to the controller 115 can control modifying parity data using a poison data unit and storing the data (also referred to herein as a first set of bits including data) and the modified parity data in the memory device 130.

In some embodiments, control circuitry 114 within each of the memory devices 130 can be configured to perform operations such as copy, write, read, error correct etc. The control circuitry 114 can include an ECC component 107. The ECC component 107 can be operated based on various types of ECC codes, such as Hamming codes, Reed-Solomon (RS) codes, Bose-Chaudhuri-Hochquenghem (BCH) codes, circular redundancy check (CRC) codes, Golay codes, Reed-Muller codes, Goppa codes, and Denniston codes, among others. As a non-limiting example, the ECC component 107 can be operated based on Hamming code and generate parity symbols (as ECC symbols). The ECC component 107 can include circuitry and/or firmware in order to perform ECC operations. The ECC component 107 can include an ECC encoder ("ENC") 111 and an ECC decoder 113. The ECC encoder 111 can include logic and/or circuitry that can cause the modification of the parity data in order to include the poison data unit within modified parity data. The ECC decoder ("DEC") 113 can include logic and/or circuitry that can cause a decoding of the modified parity data, as will be described further in association with FIG. 4 below, in order to extract the poison data unit to provide to an external device and/or a host 120.

In a non-limiting example, apparatus (e.g., the computing system 100 or the memory system 110) includes a memory system controller 115 and memory devices 130-1 to 130-N. The controller 115 can receive data from an external device, such as a host 120, and the data can include poison data, such as a poison data unit, that indicates whether a particular portion of data is poison (e.g., corrupted or incorrect). In some embodiments, the host 120 can sent write requests to the memory system 110 and cause data associated with each of the write requests to be written to a cache (not illustrated) and/or to the memory device 130. In some embodiments, the controller 115 can receive the write requests at a rate of thirty-two (32) gigatransfers per second (e.g., in some embodiments, the controller 115 can receive the write requests according to a CXL protocol). The controller 115 can also receive read requests and cause data stored in the memory device 130 to be retrieved and written to, for example, the host 120. A cache associated with the memory system 110 can include multiple cache lines, which can each be configured to store around sixty-four (64) bytes of data. Embodiments are not limited to this particular cache line size, however, and the cache line size can be chosen to correspond to a line size associated with an external processing device such as a CPU of the host 120.

The memory system controller 115 can include a processor 117 (e.g., a processing device) configured to execute instructions stored in a local memory 119. In the illustrated example, the local memory 119 of the memory system controller 115 includes an embedded memory configured to store instructions for performing various processes, operations, logic flows, and routines that control operation of the memory system 110, including handling communications between the memory system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory system controller 115, in another embodiment of the present disclosure, a memory sub-system 110 does not include a memory system controller 115, and can instead rely upon external control (e.g., provided by an external host, or by a processor or controller separate from the memory system).

In general, the memory system controller 115 can receive commands or operations from the host system 120 and can convert the commands or operations into instructions or appropriate commands to achieve the desired access to the memory device 130. The memory system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory system controller 115 can further include host interface circuitry to communicate with the host system 120 via the physical host interface, such as a PCIe/CXL interface described above. The host interface circuitry can convert the commands received from the host system into command instructions to access the memory device 130 as well as convert responses associated with the memory device 130 into information for the host system 120.

As illustrated in FIG. 1, a host 120 can be coupled to the memory system 110 via an interface 103. The interface 103 can be any type of communication path, bus, or the like that allows for information to be transferred between the host 120 and the memory system 110. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. However, in at least one embodiment, the interface 103 is a PCIe 5.0 interface that is compliant with the compute express link (CXL) protocol standard. Accordingly, in some embodiments, the interface 103 can support transfer speeds of at least 32 gigatransfers per second.

In some embodiments, the interface 103 can be configured such that signaling can be selectively transferred via the interface 103 according to multiple protocols. For example, signaling can be selectively transferred via the interface 103 according to a cache protocol in which data is transferred between a host and the memory system 110 and a memory protocol in which data is transferred between a host and the memory device 130. In some embodiments, the cache protocol can be invoked to efficiently cache data associated with the host memory 105 according to a request and response approach. In contrast, the memory protocol can be invoked to provide access to the memory device 130 by the host using read/write command with a host processor acting as a primary device and the memory device 130 acting as a secondary (e.g., subordinate) device.

In a number of embodiments, the memory device 130 can be resident on the memory system 110, however, embodiments are not so limited and, in some embodiments, the memory device 130 can be external to the memory system 110. Further, more than one memory device can be included in the computing system 100, as is illustrated in FIG. 1. As used herein, the term "resident on" refers to something that is physically located on a particular component. For example, the memory device 130 being "resident on" the memory system 110 refers to a condition in which the memory device 130 is physically within the memory system 110. The term "resident on" may be used interchangeably with other terms such as "deployed on" or "located on," herein.

The host 120 can include host memory and a central processing unit (not illustrated). The host 120 can be a host system such as a personal laptop computer, a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc.

The host 120 can include a system motherboard and/or backplane and can include a number of processing resources (e.g., one or more processors, microprocessors, or some other type of controlling circuitry). The system 100 can include separate integrated circuits or the host 120, the memory system 110, the controller 115, and the memory devices 130 can be on the same integrated circuit. The system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

The embodiment of FIG. 1 can include additional circuitry that is not illustrated so as not to obscure embodiments of the present disclosure. For example, the storage controller 110 can include address circuitry to latch address signals provided over I/O connections through I/O circuitry. Address signals can be received and decoded by a row decoder and a column decoder to access the memory device 130. It will be appreciated by those skilled in the art that the number of address input connections can depend on the density and architecture of the memory device 130.

Figure 2:
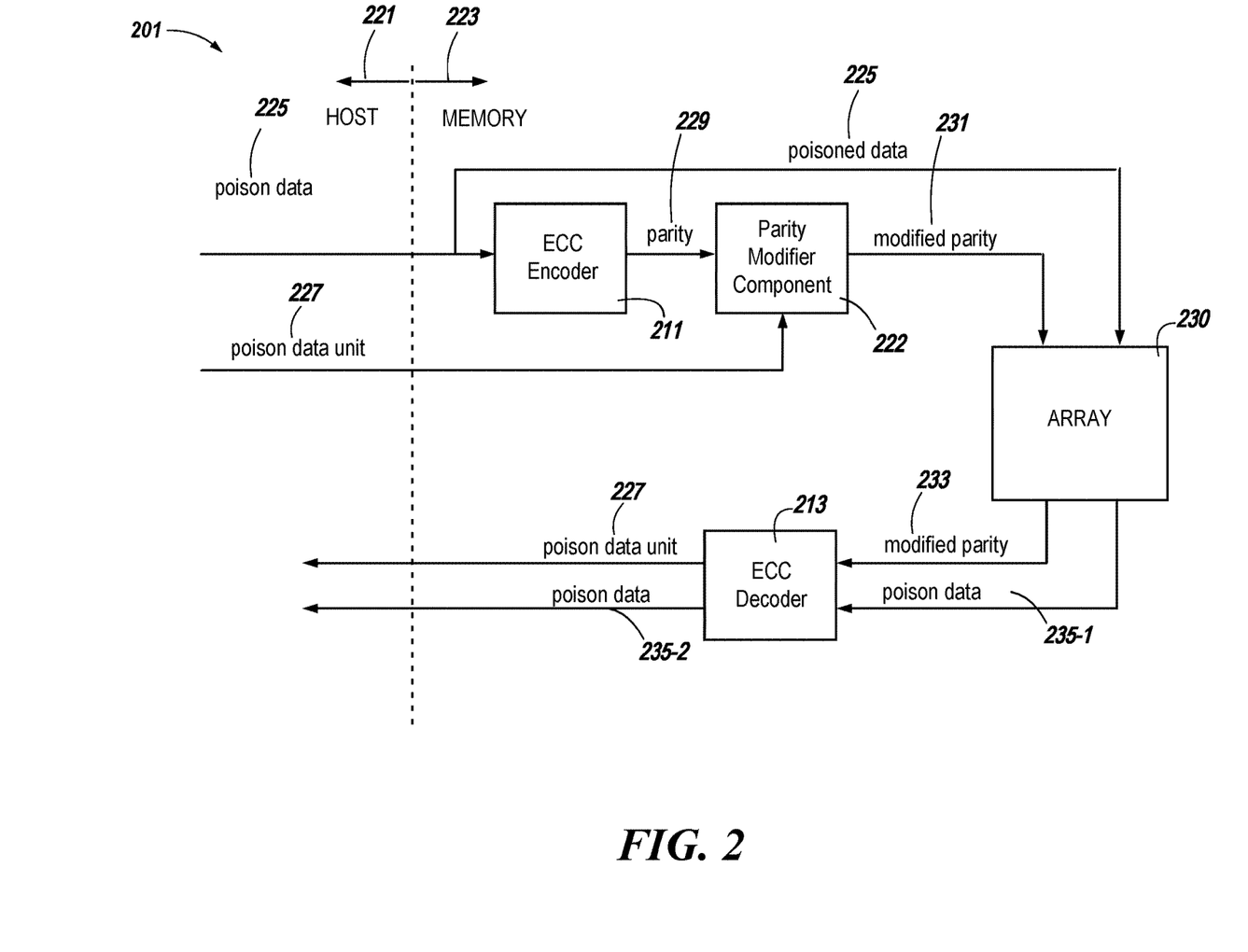
FIG. 2 is a functional block diagram in the form of a computing system in accordance with a number of embodiments of the present disclosure.

FIG. 2 is a functional block diagram in the form of a computing system 201 including a host portion 221 and a memory portion 223 including an array 230, an ECC encoder 211, a parity modifier component 222, and an ECC decoder 213 in accordance with a number of embodiments of the present disclosure. The host portion 221 indicates communication from a host, such as host 120 in FIG. 1, to the memory portion 223, such as to a memory device 130 in FIG. 1. A dotted line is illustrated where arrows crossing the dotted line indicate that communication has occurred between the host and the memory device, both to and from the memory device and from and to the host. While a host is described in this example, embodiments are not so limited. For example, an external device that is separate from the memory device (such as separate from memory device 130 in FIG. 1) can be in communication with the memory device.

In some embodiments, data can be sent from a host (e.g., from host 221) to a memory device (e.g., to memory 223). A poison data unit 227 (also referred to herein as a second set of at least one bit) can be sent as part of a write command from the host. A value of the poison data unit (e.g., a "1" or a "0") indicates whether data (such as data 225, also referred to as a first set of bits including data) is poison data or not. In the example shown in FIG. 2, the data 225 is poison data, so the poison data unit (bit) would have a value of "1", assuming "1" indicates poison and "0" indicates not poison.

While, in this example, the data is described as poison data, which correlates to a particular value of the poison data unit (e.g., a binary "1"), examples are not so limited. For instance, in another example, the received data 225 may not be poison data, in which case the value of the poison data unit may be a different bit value (such as a binary "0"). In an example where the data 225 is not poison, the parity data 229 may not be modified. That is, the parity data 229 would be modified if the data is poison and the parity data 229 would not be modified if the data was not poison, in this example. Further, the poison data 225 can be sent from the host to the ECC encoder 211 and to the array 230 of memory cells of the memory device. The ECC encoder 211 can generate parity data from the received poison data. The parity data 229 transferred from the ECC encoder 211 to the parity modifier component 222 does not yet indicate whether the poisoned data 225 is poison or not (e.g., the parity data 229 has not incorporated the poison data unit).

The parity modifier component 222 can be hardware (e.g., circuitry, combinatorial circuitry, a circuit with a state machine, etc.), firmware, and/or software configured to perform operations that result in modified parity data 231. The parity modifier component 222 can receive the parity data 229 and the poison bit 227 and modify the parity data 229 using the poison bit 227, as is described further below in association with FIG. 4. The modified parity data 231 can be sent to the array 230 along with the poisoned data 225 to be stored in memory cells of the array 230.

In response to an external device, such as a host, requesting the data from the array 230, the data (in this example, the poison data) 235-1 can be sent to the ECC decoder 213 along with the modified parity data 233. In the event that the modified parity data 231 sent to the array 230 is stored properly and transferred out of the array 230 without errors, the modified parity data 231 will be the same as the modified parity data 233. Likewise, as long as the poison data 225 is stored properly in the array 230, the poison data 235-1 is the same as the poison data 225. The ECC decoder 213 can decode the modified parity data 233 and the poison data 235 (as will be described further in association with FIG. 4 below) in order to return the poison data 235-2 and the poison bit 227 to the host.

In some embodiments, the ECC implemented in the system as described in FIG. 2 can use an extended-shortened Hamming code. A primitive binary Hamming code can be used with parameters N=511, K=502, where N (or n) is the size (or length) of the codeword including the parity data and K (or k) is the size (or length) of the codeword data without the parity data (N and K refer to the values of the primitive binary Hamming code while n and k refer to values of the shortened binary Hamming code). The Hamming code can be generated by shortening or reducing the original 511 positions of the code by 245 positions in order to match a data payload where k=257 (256 data bits+1 flip bit). The extension of the Hamming code can include adding a checksum bit, thus resulting in the code including parameters n=267, k=257, where there are 10 parity bits including the 1 checksum bit. As an example, the data payload can be a sub-multiple of the page of data, as in the amount of data accessed in a single operation (e.g., a read or write operation). The data payload can be the size that an ECC decoder uses to make a correction of the data. The size of the data payload can impact a decoding latency of the data. T The encoding operation can include performing the computation p=d'R', where p is a parity row vector of 9 bits, d' is a data row vector of 257 bits, and R' is an encoding matrix with 257 rows and 9 columns. The rows of R' can be a subset of all non-zero patterns with 9 binary elements. Each pattern can correspond to a data position and the patterns linked to the shortened positions may not be in R'. A decoding operation to decode the data and corresponding parity data can include computing a syndrome, which can be a vector of 9 bits. In response to the syndrome matching a pattern in R', the position correspondent to that pattern can be determined to contain an error, as is more clearly illustrated in association with FIG. 3.

Figure 3:
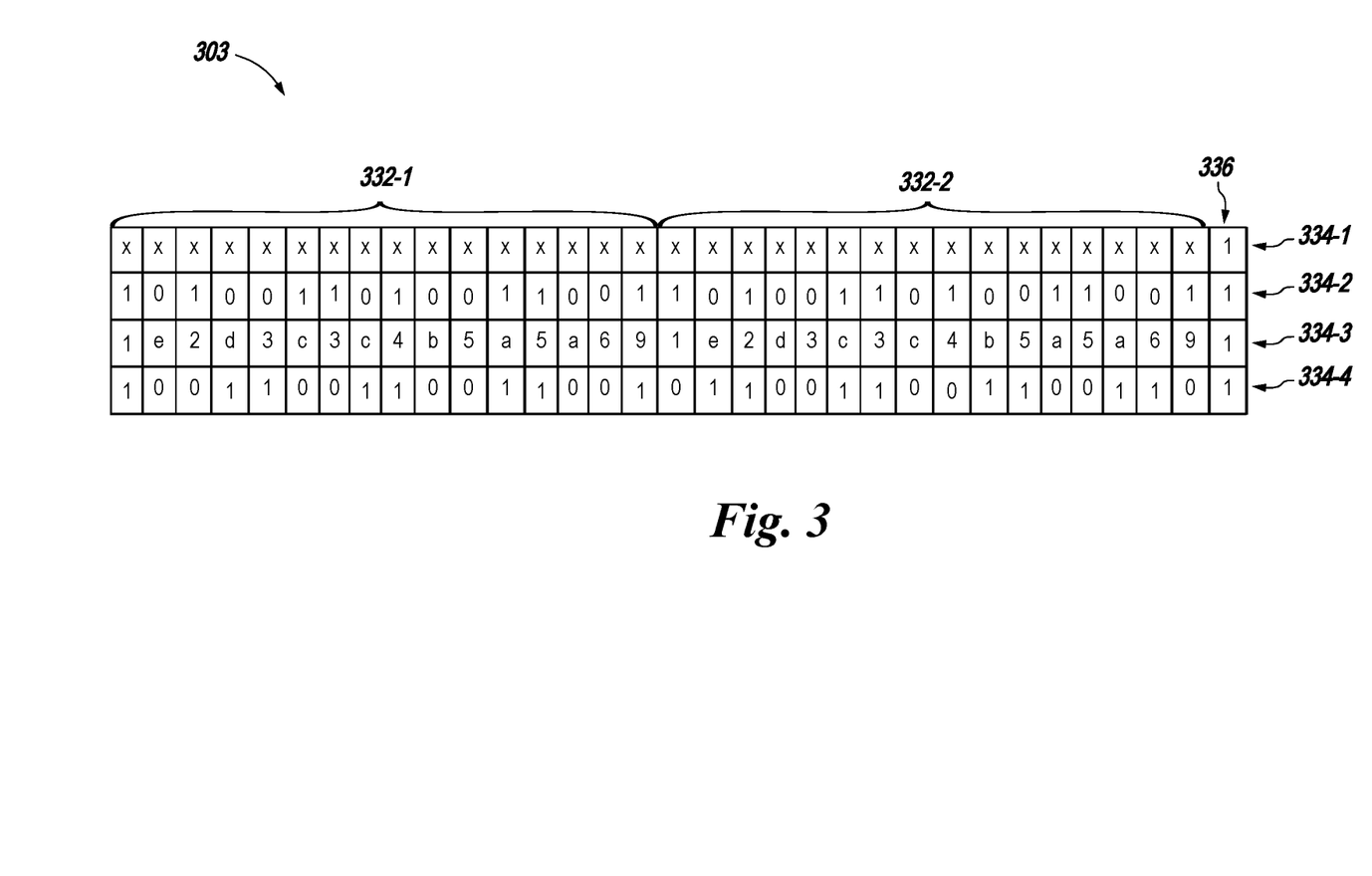
FIG. 3 is a diagram illustrating a pattern of bits in accordance with a number of embodiments of the present disclosure.

FIG. 3 is a diagram illustrating a pattern of bits 303 in accordance with a number of embodiments of the present disclosure. The patterns used for data positions can be represented by a table including 33 columns and 9 rows. For example, a first two-byte section 332-1, a second two-byte section 332-2, and a flip bit column can encompass the thirty-three (33) columns. A first row of bits 334-1 illustrates 3 variable bits (indicated by "x"), a second and fourth row 334-2, 334-4, respectively, illustrates a single bit each, and a third row 334-3 illustrates a set of four bits (indicated by hexadecimal notation). These 4 illustrates rows, 334-1, 334-2, 334-3, 334-4 thereby illustrate 9 rows. Each column of the table can correspond to 8 patterns, where the first 3 bits (indicated by "x") of the 9-bit vectors make up the 8 patterns. For example, 3 bits have $2^3$ pattern possibilities. The $33^{rd}$ column 336 can correspond to a flip-bit and does not include a pattern like the other previous 32 columns (e.g., columns of first section 332-1 and second section 332-2). Due to the flip-bit at the last column 336, the poison data unit of the data may not be indicated by inverting the data as the decoder may just correct the flip-bit.

In an example of this encoding and decoding, a 9-bit pattern referred to as p* can be used for incorporating the poison data unit into the parity data. For example, the 9-bit pattern p* corresponds to a pattern not present in the above-mentioned table. As an example, p*=000010001 (which would not be present in the above-mentioned table). The modification of the parity data can be performed by the following formula:

$$p_m = p + p*$$

In this way, the ECC decoder can correct the shortened position correspondent to p*. If the above formula is performed on the data and parity data and p* matches the predetermined p*, then a particular poison data unit is detected for the data (such as the data is indicated as poison if the particular poison data unit is detected).

In some embodiments, the p* pattern is used in the following way. The pattern p* is the pattern associated with a shortened position, i.e. p*=[0, 0, 0 . . . 1 . . . 0]R. When the user data u reaches the encoding operation, the parity p=[u, f, 0]R is computed for it. However, we add p* to the initial parity data to modify it, so we store $p_c$=p+p* in the array. Therefore, p+p*=[u, f, 0 . . . 1 . . . 0]R, i.e. $p_c$ is the parity the encoder would have calculated if there had been an error in the shortened position. For this reason, when the decoder receives the codeword [$p_c$, u, f, 0] (0 is implicit in reality), the decoder computes the syndrome obtaining S=$p_c$+[u, f, 0]R=$p_c$+p=p*. If the decoder adds the pattern recognition logic for p*, the error of the shortened position can be detected, i.e. we definitively detect the corruption of the parity in the poison bit.

In one embodiment, X data bits are received and Z error correction bits (ECC) bits are generated from the X data bits. The summation of X data bits and Z ECC bits equals Y bits. While in a scenario where there is no poison data to monitor Y bits would be stored in relation to the received X data bits, in the example described herein, Y bits would still be stored in relation to the X received data bits. Further, no additional bits are stored in order to indicate with the received data is poison data. Also, if the received data is poison data, Y bits are stored, and if the received data is not poison data, Y bits are still stored. The quantity of bits read from the array is the same regardless of whether the data is poisoned and regardless if we determine whether the data is poison or not by decoding that same number (Y) of bits.

Figure 4:
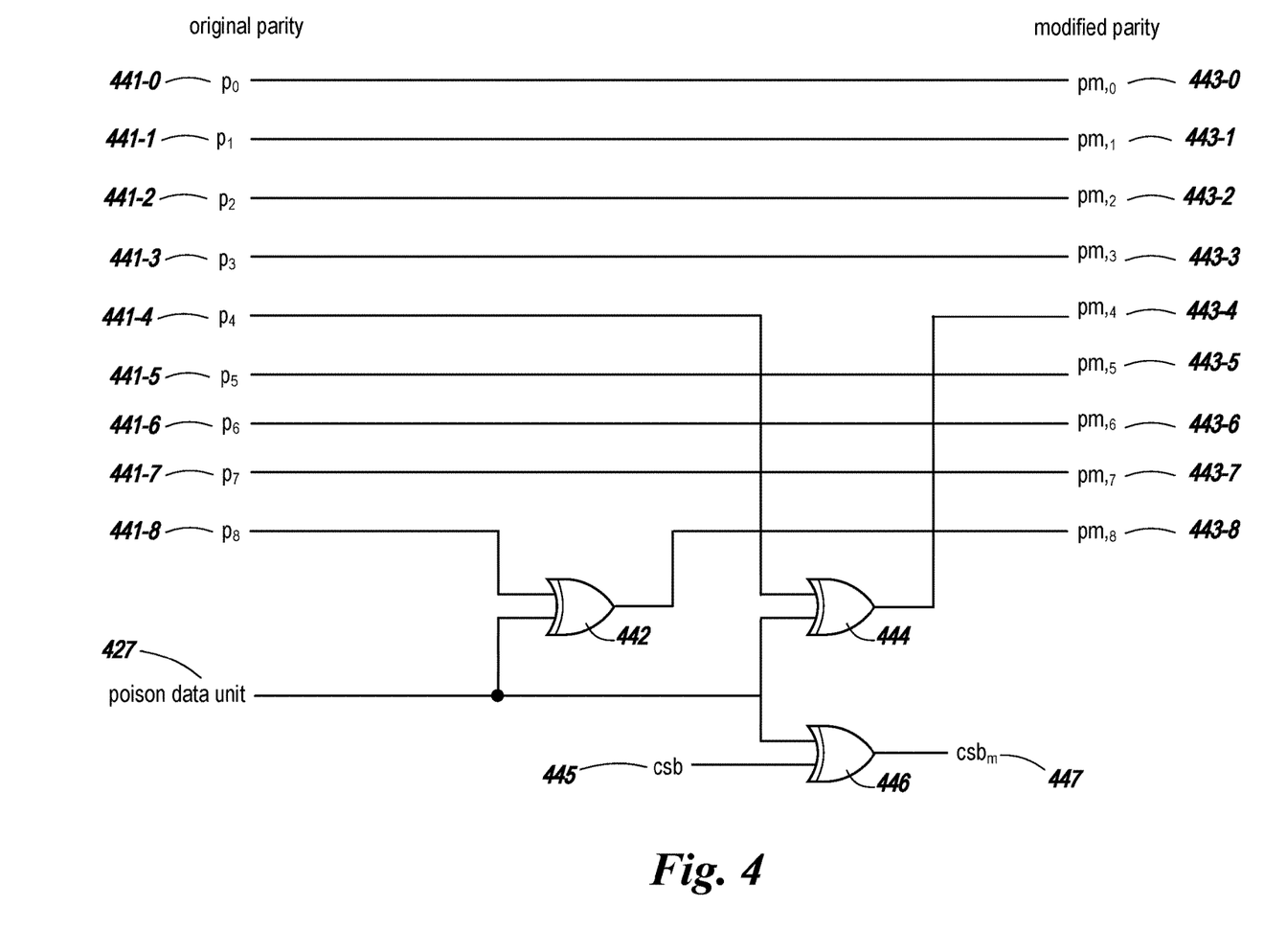
FIG. 4 is a functional block diagram illustrating encoding of parity data into modified parity data in accordance with a number of embodiments of the present disclosure.

FIG. 4 is a functional block diagram illustrating encoding of parity data into modified parity data in accordance with a number of embodiments of the present disclosure. A plurality of parity bits 441-0 (p0) to 441-8 (p8), which can be referred to collectively as parity bits 441, and a checksum bit 445 are modified using a poison bit 427. The parity bits 441 and the checksum bit 445 make up the 10 bits of the parity data described above in association with FIG. 2. The parity bits 441 are modified using the poison bit 427 and the checksum bit ("csb"), resulting in modified parity bits 443-0 ($p_m$,0) to 443-8 ($p_m$,8).

As an example, and as illustrated in FIG. 4, a ninth parity bit 441-8 (p8) can be XORed (indicated by XOR gate 442) with the poison bit 427, resulting in the ninth modified parity bit $p_m$,8 443-8. Likewise, a fifth parity bit p4 441-4 can be XORed (indicated by XOR gate 444) with the poison data unit 427, resulting in a fifth modified parity bit pm,4 443-4. Further, a checksum bit ("csb") 445 can be modified by performing an XOR operation (indicated by XOR gate 446) on the poison data unit 427 and the checksum bit 445, resulting in a modified checksum bit ("csbm") 447. The results of these operations, and those not described in detail but illustrated in FIG. 4, can be used during the decoding operation, described further below in association with FIG. 4.

Figure 5:
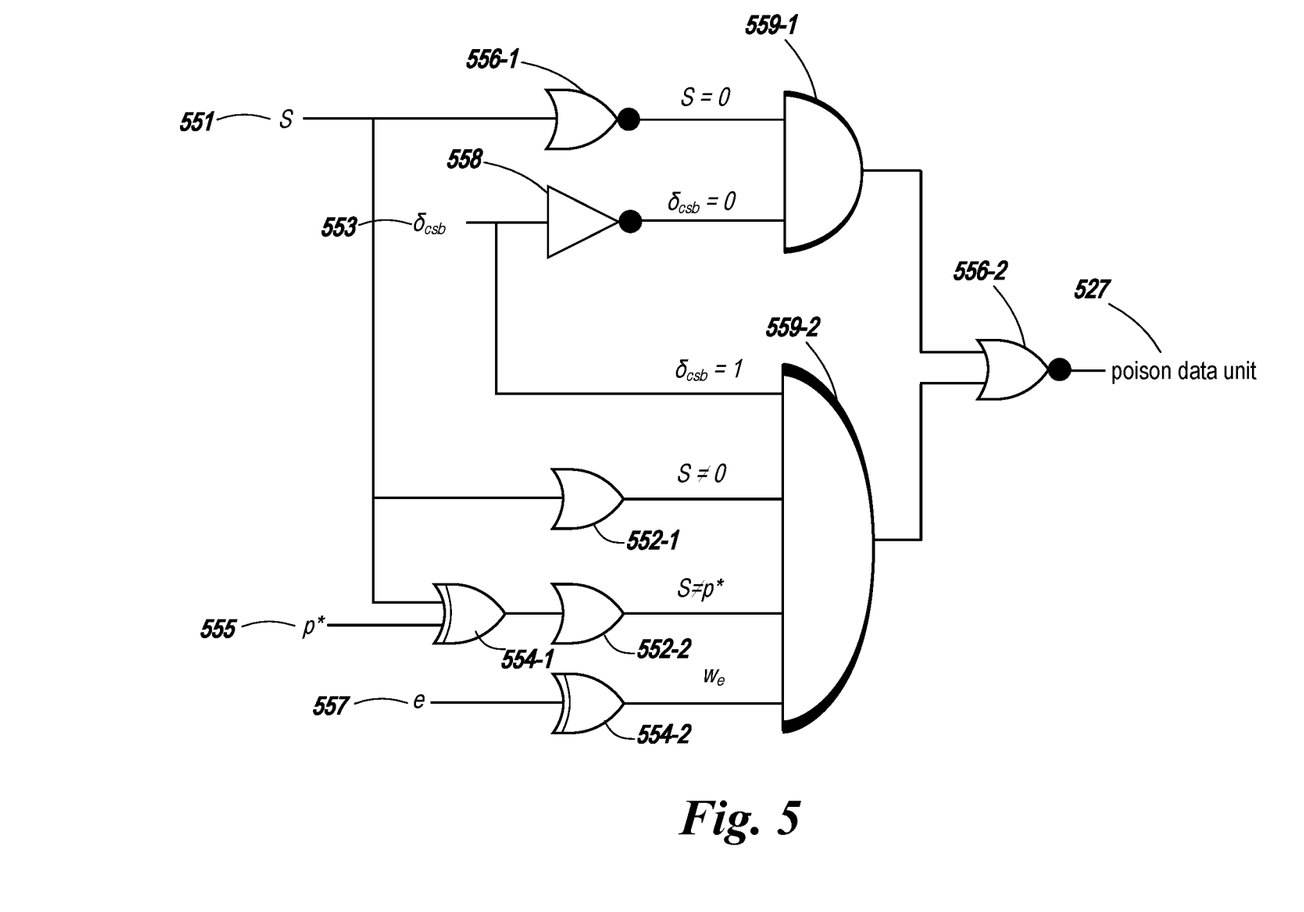
FIG. 5 is another functional block diagram illustrating decoding of modified parity data in accordance with a number of embodiments of the present disclosure.

FIG. 5 is another functional block diagram illustrating decoding of modified parity data in accordance with a number of embodiments of the present disclosure. Prior to the performance of the logical operations indicated by the logic gates illustrated in FIG. 5, a syndrome of the modified parity data described above is determined. In some examples, using a Hamming code can include checking for errors in the data by checking all of the parity bits. The pattern of errors, called the error syndrome, identifies the bit in error. If all parity bits are correct, there is no error. Otherwise, the sum of the positions of the erroneous parity bits can identify the erroneous bit. For example, if the parity bits in positions 1, 2, and 8 indicate an error, then bit 1+2+8=11 is in error. If only one parity bit indicates an error, the parity bit itself is in error.

As is illustrated in FIG. 5, the syndrome 551 (S), the predetermined pattern 555 (p*), and an error vector 557 (e) generated by the decoder (such as decoder 113 in FIG. 1) can be used to determine the poison bit 527 corresponding to the data. For example, the syndrome 551 can be used as an input into a number of logical gates, such as NOR gate 556-1, OR gate 552-1, and XOR gate 554-1. The pattern 555 can be used as an input along with the syndrome 551 into the XOR gate 554-1. The result of the XOR gate 554-1 is used as an input into an OR gate 552-2. In this example, the error vector 557 is used as an input into an XOR gate 554-2. Further, a summation of a checksum bit 553 is used as input into a NOT gate 558. The result of the NOR gate 556-1 and the NOT gate 558 are used as inputs into an AND gate 559-1. Also, the summation checksum bits 553 and the results of the OR gates 552-1, 552-2 and the XOR gate 554-2 are used as inputs into an AND gate 559-2. The result of the XOR gate 554-2 can be referred to as the parity of the error ($w_e$). As an example, the parity (even or odd) of a binary vector v can be defined as the binary value: w(v)mod 2), where w(v) is the weight function, i.e., the function returning the number of "1"s in the vector. Therefore, if the number of "1"s in the vector is even, the parity is "0," while if the number of "1"s in the vector is odd, the parity is "1." For example, the parity of [0110100101010010] is "1." In other words, the parity is the bit ("0" or "1") that is juxtaposed to the vector in order to obtain a vector composed of an even number of "1"s. The results of the AND gates 559-1, 559-2 are used as inputs into an XOR gate 556-2. The result of the XOR gate 556-2 is the poison bit 527. In this way, the modified parity bits can be decoded in order to obtain the poison bit 527.

The operations described in association with FIG. 5 can indicate a particular characteristic of the data being stored into the memory and transferred out of the memory. For example, whether the data is poison, whether the data includes a particular quantity of errors, etc. can be determined. Table 1 illustrates such determinations:

TABLE 1

|  | S = 0 | S = p* | S ≠ 0, p* | |
|---|---|---|---|---|
| δ csb = 0 | Regular 0 errors | Poison (host poison or >1 error) | Poison (host poison or >1 error) | |
| δ csb = 1 | Poison (host poison or >1 error | Host poison 0 errors | $w_e$ = 1 Regular 1 error | $w_e$ = 0 Host Poison |

For example, in the situation where S=0 and the delta checksum=0, the data can be determined to be regular with zero errors. Likewise, in the situation where S=0 and the delta checksum=1, the data can be determined to be poison where the data was poison from the host or contains more than 1 error. The unique situation arises where the delta checksum is 1 and S≠0 or p*. In this instance, if $w_e$=1, the data can be considered regular with 1 error. In this instance, if $w_e$=0, the data can be considered poison from the host.

Figure 6:
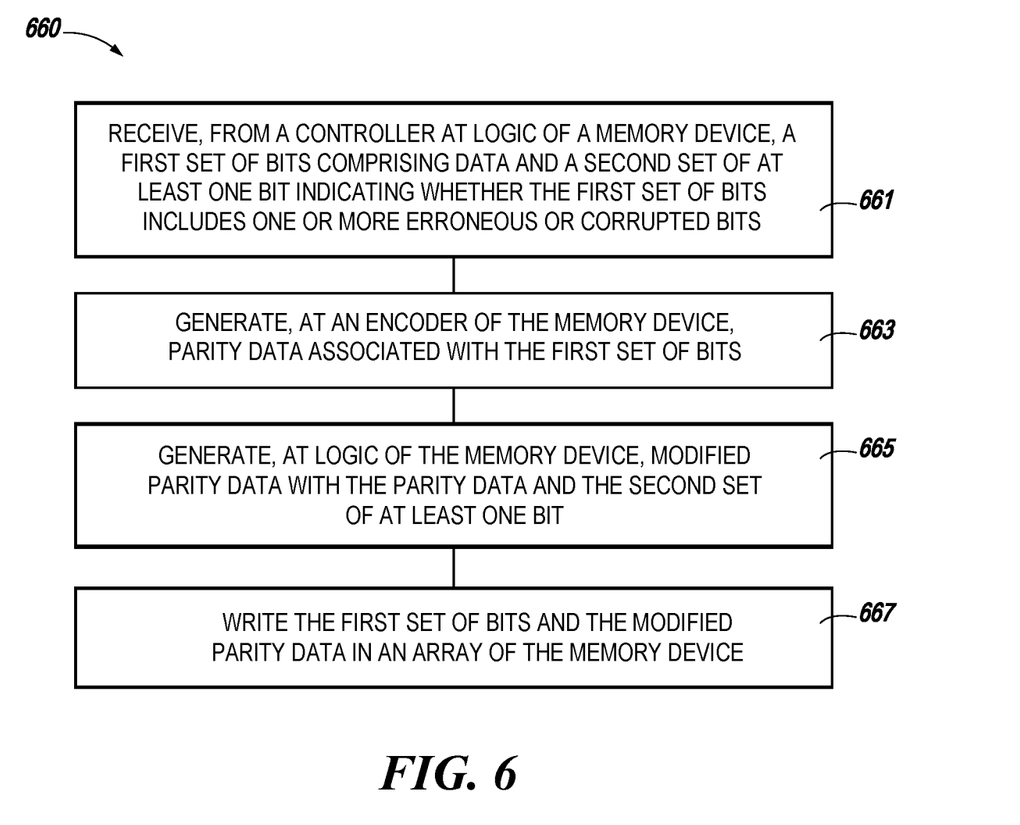
FIG. 6 is a flow diagram representing an example method for encoding parity data using a poison data unit in accordance with a number of embodiments of the present disclosure.

FIG. 6 is a flow diagram representing an example method for encoding parity data using a poison data unit in accordance with a number of embodiments of the present disclosure. The method 660 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 660 is performed by the controller 115 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 661, the method 660 can include receiving, from a controller at logic of a memory device, a first set of bits including data and a second set of at least one bit (e.g., a poison data unit) associated with the first set of bits. The controller can be analogous to the controller 115 in FIG. 1, herein. The memory device can be analogous to the memory system 110 in FIG. 1, herein. In some examples, the first set of bits and the second set of at least one bit (e.g., poison data) are received via a compute express link (CXL) compliant interface. The value of the poison data unit can indicate whether the first set of bits has been corrupted or has become uncorrectable. The first set of bits (e.g., data) can be determined to be uncorrupted or corrupted based on the value of the poison data unit. For instance, in some examples, a poison bit value of "1" can be used to indicate the data is corrupted and a poison bit value of "0" can be used to indicate the data is uncorrupted.

At block 663, the method 660 can include generating, at an encoder of the memory device, parity data associated with the first set of bits (e.g., data). The encoder can be analogous to the encoder component 111 in FIG. 1, herein. Generating the parity data can include generating an extended shortened Hamming code.

At block 665, the method 660 can include generating, at logic of the memory device, modified parity data with the parity data and the second set of at least one bit (e.g., poison data unit). Generating the modified parity can include performing a number of logical operations on the poison data unit and the parity data resulting in the modified parity data.

At block 667, the method 660 can include writing the first set of bits and the modified parity data in an array of the memory device. The array can be analogous to an array of memory cells in the memory device 130 in FIG. 1, herein.

The method 660 can further include reading the written modified parity data and the first set of bits from the array. The method 660 can further include generating, via a decoder component, the poison data unit. The decoder component can be analogous to the decoder component 113 in FIG. 1, herein. The method 660 can further include providing the poison data unit and the data to a host.

Figure 7:
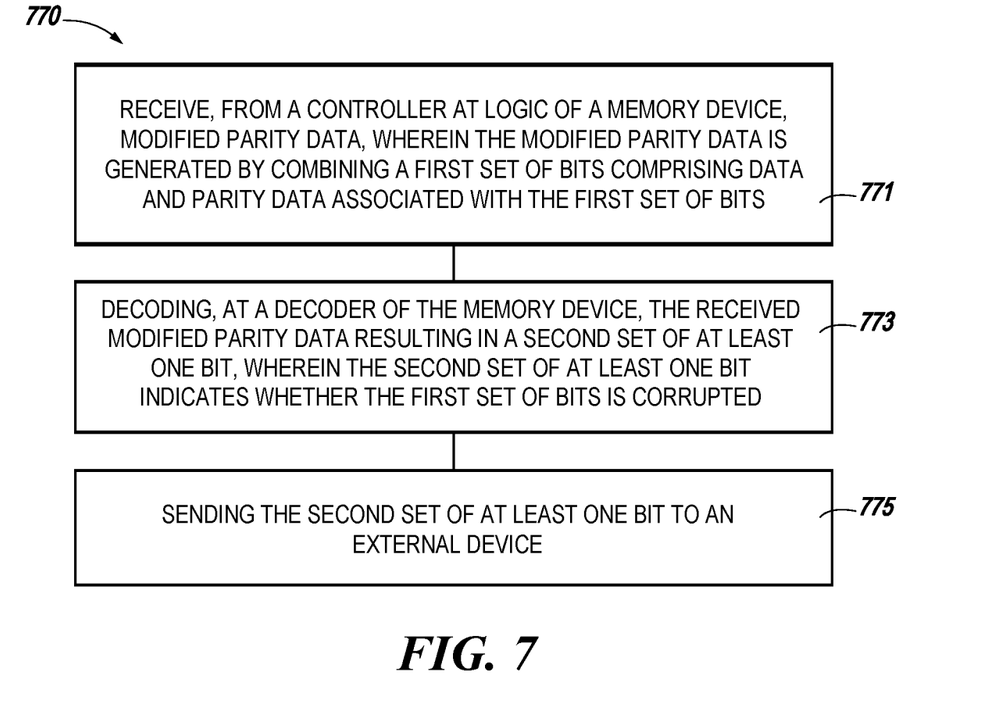
FIG. 7 is a flow diagram representing an example method for decoding modified parity data using a poison data unit in accordance with a number of embodiments of the present disclosure.

FIG. 7 is a flow diagram representing an example method for decoding modified parity data using a poison data unit in accordance with a number of embodiments of the present disclosure. The method 770 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 770 is performed by the controller 115 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 771, the method 770 can include receiving, from a controller at logic of a memory device, modified parity data, wherein the modified parity data is generated using the parity data and a poison data unit associated with the data. The modified parity data can be previously generated by combining the parity data associated with a first set of bits and a second set of at least one bit indicating whether the first set of bits includes at least one erroneous or corrupted bit (e.g., a poison data unit) via an error correction code (ECC) encoder. The parity data and the poison data unit can be initially received from a host. The controller can be analogous to the controller 115 in FIG. 1, herein. The memory system can be analogous to the memory system 110 illustrated in FIG. 1, herein. In some examples, the data and the poison data unit are received via a compute express link (CXL) compliant interface. The poison data unit can indicate whether the data has been corrupted or has become uncorrected. The data can be determined to be uncorrupted or corrupted based on the poison data unit being a particular data value. In some examples, the data can be determined to be corrupted based on the poison data unit being a "1" bit and determined to be uncorrupted based on the poison data unit being a "0" bit.

At block 773, the method 770 can include decoding, at a decoder of the memory device, the received modified parity data resulting in a poison data unit. In some examples, the modified parity data can include a modified checksum value The poison data unit can indicate whether the data is corrupted. The decoder component can be analogous to the encoder component 113 in FIG. 1, herein. The initial parity data prior to modification can be generated using an extended shortened Hamming code. The decoding can include determining whether a syndrome of the modified parity data includes a pattern that indicates the data is poison data.

At block 775, the method 770 can include sending the poison data unit to an external device, such as a host 120 in FIG. 1. The method 770 can further include decoding the received modified parity data by determining a checksum value from the modified checksum value. Determining the checksum value can include determining a characteristic of the data. The determined characteristic of the data can include one of whether the data is regular data or poison data, or whether the data is correct data or corrupted data. The method 770 can further include reading the stored modified parity data and the data from the array. The method 770 can further include generating, via a decoder component, the poison data unit. The decoder component can be analogous to the decoder component 113 in FIG. 1, herein. The method 770 can further include providing the poison data unit and the data to a host.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, from a controller at logic of a memory device, a first set of bits comprising data and a second set of at least one bit indicating whether the first set of bits includes one or more erroneous or corrupted bits;
   generating, at an encoder of the memory device, parity data associated with the first set of bits;
   generating, at the logic of the memory device, modified parity data with the parity data and the second set of at least one bit, wherein:
      in response to the second set of at least one bit indicating the data is poison data, the modified parity data comprises a summation of parity data and a poison pattern; and
      the poison pattern indicates whether the first set of bits includes one or more erroneous or corrupted bits; and
   writing the first set of bits and the modified parity data in an array of the memory device.

2. The method of claim 1, wherein:
   the received first set of bits comprises X quantity of data bits;
   the parity data comprises Z quantity of parity bits; and
   the first set of bits comprises X data bits and the stored modified parity data comprises Z parity bits;
   wherein X and Z are integers.

3. The method of claim 2, wherein a summation of the X data bits and the Z parity bits equals Y bits, and Y bits stored in relation to the received data indicate whether the received data is poison data, wherein Y is an integer.

4. The method of claim 1, wherein a quantity of bits of the parity data and a quantity of bits of the modified parity data are equal.

5. The method of claim 1, further comprising:
   reading the written modified parity data and the first set of bits from the array;
   generating, via a decoder of the memory device, the second set of data; and
   providing the second set of data and the first set of bits to a host.

6. The method of claim 1, wherein the first set of bits and the second set of bits are received via an interface configured to communicate using a Compute Express Link (CXL) protocol.

7. The method of claim 1, wherein the second set of bits indicate whether the data has been corrupted.

8. The method of claim 1, wherein generating the modified parity data comprises performing a number of logical operations on the second set of at least one bit and the parity data resulting in the modified parity data.

9. The method of claim 1, further comprising determining the first set of bits is not corrupted based on the second set of at least one bit being a particular data value.

10. The method of claim 1, further comprising determining the first set of bits is corrupted based on the second set of at least one bit being a particular data value.

11. The method of claim 1, wherein generating the parity data comprises generating an extended shortened Hamming code.

12. A method, comprising:
receiving, from a controller at logic of a memory device, modified parity data, wherein the modified parity data is generated by combining a first set of bits comprising data and parity data associated with the first set of bits;
decoding, at a decoder of the memory device, the received modified parity data resulting in a second set of at least one bit, wherein:
the second set of at least one bit indicates whether the first set of bits includes at least one error or is poison data based on whether the modified parity data includes a poison pattern; and
the poison pattern indicates whether the first set of bits includes one or more erroneous or corrupted bits; and
sending the second set of at least one bit to an external device.

13. The method of claim 12, further comprising generating the modified parity data by combining the first set of bits and the parity data via an error correction code (ECC) encoder.

14. The method of claim 12, further comprising receiving the first set of bits and the second set of at least one bit from a host.

15. The method of claim 12, further comprising determining whether the first set of bits is corrupted based on the second set of at least one bit.

16. The method of claim 12, wherein the decoding comprises determining whether a syndrome of the modified parity data includes the poison pattern that indicates the first set of bits is poison data.

17. The method of claim 12, wherein:
the modified parity data includes a modified checksum value; and
decoding the received modified parity data comprises determining a checksum value from the modified checksum value.

18. The method of claim 17, wherein determining the checksum value comprises determining a characteristic of the first set of bits.

19. The method of claim 18, wherein the determined characteristic of the first set of bits comprises one of whether the first set of bits is regular data or poison data, or whether the data is correct data or corrupted data.

20. An apparatus, comprising:
a controller at logic of a memory device;
an encoder in communication with the controller and configured to:
receive a first set of bits comprising data and a second set of at least one bit indicating whether the first set of bits is poison data; and
combine the first set of bits and the second set of at least one bit into a modified parity value, wherein:
in response to the second set of at least one bit indicating the data is poison data, the modified parity value comprises a summation of parity data and a poison pattern; and
the poison pattern indicates whether the first set of bits includes one or more erroneous or corrupted bits; and
wherein the controller is configured to cause writing of the modified parity value and the received first set of bits in a memory array of the memory device.

21. The apparatus of claim 20, further comprising a decoder of the memory device in communication with the controller and coupled to the memory array, wherein logic of the decoder is configured to:
receive the first set of bits and the modified parity data; and
determine a subsequent second set of at least one bit from the modified parity data.

22. The apparatus of claim 20, wherein the controller is configured to send the second set of at least one bit and the first set of bits to a host.

23. The apparatus of claim 22, wherein the controller is configured to send the second set of at least one bit and the first set of bits to the host in response to the host requesting retrieval of the first set of bits from the memory array.

* * * * *